United States Patent
Cook et al.

(10) Patent No.: US 12,221,394 B2
(45) Date of Patent: Feb. 11, 2025

(54) DOPED OR ALLOYED MATERIALS AND HOT ISOSTATIC PRESSING METHOD OF MAKING SAME

(71) Applicant: Government of the United States, as represented by the Secretary of the Air Force, Wright-Patterson AFB, OH (US)

(72) Inventors: Gary Cook, Beavercreek, OH (US); Ronald W. Stites, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/472,560

(22) Filed: Sep. 22, 2023

(65) Prior Publication Data
US 2024/0010575 A1    Jan. 11, 2024

Related U.S. Application Data

(62) Division of application No. 16/067,209, filed as application No. PCT/US2017/025719 on Apr. 3, 2017, now Pat. No. 11,814,326.

(60) Provisional application No. 62/368,665, filed on Jul. 29, 2016, provisional application No. 62/320,110, filed on Apr. 8, 2016.

(51) Int. Cl.
C04B 41/51    (2006.01)
C04B 35/547   (2006.01)
C04B 41/00    (2006.01)
C04B 41/45    (2006.01)

(52) U.S. Cl.
CPC ........ *C04B 41/5133* (2013.01); *C04B 35/547* (2013.01); *C04B 41/0072* (2013.01); *C04B 41/009* (2013.01); *C04B 41/4517* (2013.01); *C04B 41/4521* (2013.01)

(58) Field of Classification Search
CPC . C04B 35/547; C04B 41/009; C04B 41/5133; C04B 41/4517; G02B 1/00; C03C 21/008
See application file for complete search history.

(56) References Cited

U.S. PATENT DOCUMENTS

| 4,939,043 A * | 7/1990 | Biricik ..................... G02B 1/02 428/641 |
| 5,281,465 A * | 1/1994 | Wahl ...................... C03C 21/008 427/376.6 |
| 2007/0064748 A1* | 3/2007 | Mirov ....................... G02F 1/39 372/20 |
| 2016/0017486 A1* | 1/2016 | Goela ..................... C23C 16/44 106/286.6 |

* cited by examiner

*Primary Examiner* — Alex B Efta
(74) *Attorney, Agent, or Firm* — AFMCLO/JAZ; Jeffrey V. Bamber

(57) ABSTRACT

A doped substrate having a substrate comprising at least one of a glass material, a single crystal material, a poly-crystalline material, a ceramic material, or a semiconductor material. The doped substrate includes a dopant comprising one or more transition metals, one or more rare earth elements, or a combination of both, the doped substrate characterized in that a spectral laser output of the doped substrate exhibits a nominally single frequency having a linewidth less than about 5 nm.

14 Claims, 13 Drawing Sheets

DOPED OR ALLOYED MATERIALS AND HOT ISOSTATIC PRESSING METHOD OF MAKING SAME

CROSS-REFERENCE TO RELATED APPLICATIONS

This is a divisional application of U.S. Non-Provisional Application Ser. No. 16/067,209 filed on Jul. 29, 2018, which claimed the benefit of and priority to PCT Application Serial No. PCT/US17/25719 filed on 3 Apr. 2017, which claimed the benefit of and priority to U.S. Provisional Patent Application Ser. Nos. 62/320,110 and 62/368,665, filed on Apr. 8, 2016 and on Jul. 29, 2016, respectively. The contents of each of these applications are each incorporated herein by reference, each in its entirety.

RIGHTS OF THE GOVERNMENT

The invention described herein may be manufactured and used by or for the Government of the United States for all governmental purposes without the payment of any royalty.

FIELD OF THE INVENTION

The present invention relates to doped or alloyed materials, and more particularly to doped or alloyed materials prepared via a hot isostatic pressing method.

BACKGROUND

Laser materials cover all known forms of physical materials, from gases to plasmas, from liquids to solids. Solid laser materials are very popular because they are relatively easy to engineer into laser devices, require no "containers" to hold the laser medium in place, and they can be produced with very high optical quality. In most cases solid laser materials comprise some kind of passive host material, such as a polymer, glass, or crystal, into which is added (or "doped") a quantity of active laser ions or laser compound. The laser dopant might comprise a molecular species such as an organic dye or chelate, but more commonly comprise atoms in the form of charged ions which are dispersed through the passive host. These ions may occupy the atomic site of one of the host constituent atoms (e.g. by substitution), or the ions may reside in between the resident host atoms as interstitial ions. Laser action occurs when externally applied (pump) energy, often in the form of an optical pulse, is absorbed by the ions and leads to a temporary increase in the ionic energy. Subsequent relaxation from this higher energetic state results in the liberation of a photon of characteristic frequency for the originating ionic species. Laser action results when this photon encourages subsequent photons to be liberated from adjacent ions, so that all of the emitted photons emerge with identical phase.

In all of these permutations, the role of the host material is primarily to hold the active ions fixed in space so they do not change their relative locations with respect to one another. This is to prevent deleterious effects on the laser properties to occur, such as concentration quenching or changes to the excited state lifetime of the laser ions. The host material must also be transparent throughout the intended operating wavelength range of the laser and pumping wavelengths. The host material, although passive, can affect the laser characteristics of the embedded active ions. The influence the host has on the active laser ions depends on the electronic structure of the laser ions. For example, rare earth ions, such as neodymium or ytterbium, have laser properties that are only slightly affected by the laser host. This is because the electrons which contribute to laser emission in these species are not the electrons in the outermost shell of the ions; the active laser electrons are deeper within the ions and are partially "shielded" by the outer electrons. The host electrons therefore are unable to perturb the behavior of the deeper laser-related electrons in rare earth materials, which results in the observed insensitivity to the host. However, the same is not true for other laser ions such as transition metals.

Transition metal lasers have become very popular as a source of efficient, tunable, mid infra-red laser light. But unlike rare earths, transition metal ions have a laser-related electronic structure which occurs in the outermost layers of the ion. This makes transition metals extremely sensitive to their environment. This sensitivity is what leads to the extraordinary tunability of transition metal lasers, where the host material changes the excitation and relaxation properties of the embedded laser ion.

While a passive host can have a profound impact on the embedded active laser material, the same is often true in reverse (i.e., the addition of active laser ions can change the physical properties of the passive host.) Many of the best solid state laser materials are crystals. Crystals provide optical and thermal advantages over glasses and polymers, but crystal growth is very sensitive to the presence of impurities. The added laser ion dopants act as impurities and can adversely affect, or even prevent, crystal formation with conventional methods such as Czochralski growth, top-seeded solution growth, Bridgman growth, etc. This places severe limitations on the obtainable concentrations of active ions that can be applied to many laser hosts. For these reasons, post-growth thermal diffusion of active ions is sometimes used as an alternative method for introducing a dopant species into an already established solid host.

A primary example of this technique is the current industry-standard method of fabricating transition metal doped II-VI crystals, such as Cr:ZnSe and Fe:ZnSe. The standard method takes polished polycrystalline samples of ZnSe (for example) onto which a thin layer of metallic dopant (e.g. 100 nm-1000 nm Cr or Fe) is deposited using standard evaporation or sputtering techniques. The metal coated crystal is then sealed into a quartz tube, usually under vacuum, and then heated (typically 900° C.-1100° C.) for a prolonged period until sufficient thermal diffusion of the deposited metal layer into the crystal substrate has taken place.

The process of thermal diffusion takes a considerable length of time, often requiring many weeks of high temperature exposure. Some attempts have been made to accelerate the process by applying intense gamma radiation to the system to enhance the diffusion rate of ions, but this has yielded only a modest improvement in the processing times. In all cases, conservation of electrical charge is required. Hence, unless the diffusion process is interstitial in nature (which may permit neutral metallic ions to be implanted), substitution of the host ions with the dopant results in an ionic exchange with host ions. This gradually replaces the external metal layer with a layer comprising neutralized host ions. For example, with Cr:ZnSe, Cr metal ions are taken up as $Cr^{2+}$ ions by the host, while $Zn^{2+}$ ions are liberated and converted to Zn metal through capture of the two electrons from the incoming Cr ions. Zinc metal therefore forms in place of the Cr ions at the surface of the crystal. This process continues (providing there is sufficient thermal exposure time) until an equilibrium is established between the relative concentrations of the Cr and Zn ions within, and surrounding, the crystal.

After processing, the thermal diffusion treated crystal requires re-polishing to remove the excess Zn/Cr metal and, due to the low pressure and high temperatures employed, surface damage is common through partial evaporation of the applied metal layer and of the substrate. The length of time required for conventional thermal diffusion, together with the extensive re-processing, makes crystals made by this technique expensive and difficult to obtain reproducibly. Often a larger sample must be "mined" to locate regions of approximately the required doping concentration, adding further to the overall cost.

In view of the foregoing, new methods are needed to make improved doped or alloyed materials that are suitable for use in various applications, such as lasers.

SUMMARY

The present invention overcomes the foregoing problems and other shortcomings, drawbacks, and challenges of making doped or alloyed materials that are suitable for laser applications, and that are finely-tunable and provide extremely narrow linewidth performance. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a method of forming a doped substrate, comprises: (a) heating a substrate comprising a layer of a dopant on at least one surface to a predetermined temperature; (b) applying a predetermined degree of isostatic external pressure on the surface of said substrate at said predetermined temperature for a time sufficient to induce migration of the dopant into the substrate to provide a doped substrate; and (c) removing the isostatic pressure and cooling the doped substrate to about room temperature. Although the application of an elevated temperatures and pressures may be presented as sequential (see claims), the elevated temperature and high pressure may be applied simultaneously.

The high pressure and elevated temperature of the Hot Isostatic Pressing (HIP) process encourages thermal migration of the dopant into the substrate, and removes defects from the substrate. In addition, the dopant concentration in the substrate is significantly higher (i.e., at least twice as high) than concentrations achieved up to this time, and the rate of dopant diffusion into the substrate is at least three orders of magnitude faster than known methods.

According to another embodiment of the present invention, the substrate may be a glass material, a single crystal material, a poly-crystalline material, a ceramic material, or a semiconductor material. The doped substrates are useful in a broad range of platforms and technologies, e.g. laser applications.

According to a further embodiment of the present invention, the substrate is optically transparent. The optical transparency of the substrate renders it useful in a wide variety of optical applications.

According to another embodiment of the present invention, the dopant comprises one or more transition metals, one or more rare earth elements, or a combination of both. The metallic dopant may be an atomic or ionic species of an element selected from the group consisting of silver, gold, cobalt, chromium, copper, iridium, iron, manganese, molybdenum, niobium, nickel, palladium, platinum, rhenium, rhodium, ruthenium, tantalum, titanium, vanadium, tungsten, zirconium, scandium, yttrium, lanthanum, cerium, praseodymium, neodymium, samarium, europium, gadolinium, terbium, dysprosium, holmium, erbium, thulium, ytterbium, lutetium, or combinations thereof The broad applicability of so many dopants means that the performance of an apparatus, e.g. a laser, incorporating the doped substrate may be easily tuned for optimal desired performance characteristics.

According to further embodiment of the present invention, the layer of a dopant comprises one or more segregated layers of distinct chemical species. A multiplicity of dopant materials may also be applied simultaneously, as a blended layer or as a eutectic.

Advantageously, the doped substrate may be easily tuned for optimal desired performance characteristics.

According to another embodiment of the present invention, the substrate is selected from the group consisting of Zinc selenide (ZnSe), Zinc Sulphide (ZnS), Yttrium Aluminum Garnet (YAG), Yttrium Lithium Fluoride (YLF), Yttrium orthovanadate (Nd:YVO4), Neodymium doped yttrium calcium oxoborate Nd:YCa$_4$O(BO$_3$)$_3$, silicate glass, phosphate glass, sapphire, lithium strontium (or calcium) aluminum fluoride (Ce:LiSAF, Ce:LiCAF), chrysoberyl (alexandrite), calcium fluoride (CaF$_2$), Gallium Nitride (GaN), Gallium Phosphide (GaP), Indium Gallium Nitride (InGaN), Aluminum Gallium Indium Nitride (InGaInP), Aluminum Gallium Arsenide Phosphide (InGaAsP), Lithium niobate (LiNbO$_3$), Potassium Niobate (KNbO$_3$), Strontium Barium Niobate (SBN), Yttrium Scandium Gallium Garnet (YSGG), Yttrium Vanadate (YVO4), Terbium Gallium Garnet (Tb$_3$Ga$_5$O$_{12}$), Potassium Gadolinium Tungstate (KGW), Forsterite (Mg$_2$SiO$_4$), Barium Yttrium Fluoride (BaY$_2$F$_5$), Barium Yttrium Lutetium Fluoride (BaYLuF$_5$), and combinations thereof.

Advantageously, the doped substrate may be easily tuned for optimal desired performance characteristics.

According to a further embodiment of the present invention, the predetermined temperature is between about 100° C. to about 2,500° C. The degree of isostatic pressure is between about 1,000 PSI to about 250,000 PSI. The time sufficient to induce migration of the dopant into the substrate is between about 1 hour to about 1,000 hours.

The desired combination of temperature, pressure, and time for a particular substrate and one or more dopants permits tuning of the doped substrate to meet desired performance characteristics.

According to another embodiment of the present invention, the substrate is ZnSe or ZnS, and the dopant is chromium or iron.

According to a further embodiment of the present invention, a thickness of the layer of dopant is within a range from about 60 Å to about 60,000 Å. The dopant may be sputtered onto the substrate, or another method may be utilized to apply the dopant to the substrate.

According to another embodiment of the present invention, heating of the substrate and applying the degree of isostatic pressure is performed in a non-reactive atmosphere. The non-reactive atmosphere may comprise Argon, Nitrogen, Carbon Dioxide, Neon, Helium, or combinations thereof. For purposes of this application, it is noted that 'non-reactive' means that the gases are non-reactive with respect to the disclosed process and the materials utilized.

According to another embodiment of the present invention, a doped substrate comprises a substrate comprising at least one of a glass material, a single crystal material, a poly-crystalline material, a ceramic material, or a semiconductor material; and a dopant comprising one or more transition metals, one or more rare earth elements, or a combination of both, the doped substrate characterized in that a spectral laser output of the doped substrate exhibits a nominally single frequency having a linewidth less than about 5 nm. The linewidth may be less than about 1 nm, less than about 140 pm, or less than about 50 pm.

According to a further embodiment of the present invention, a doped substrate may be made by the disclosed methods and with any of the substrate materials and dopant materials presented herein. The spectral laser output of the doped substrate may be characterized by a nominally single frequency having a linewidth less than about 1 nm, less than about 500 pm, less than about 140 pm, or less than about 50 pm. The laser efficiency is may be improved by an increase in the optical intensity (i.e., spectral brightness) in which all of the active ions are able to contribute to the same optical emission through conversion to a homogeneously broadened emission spectrum. The HIP process may also reduce scatter, and this may also improve the laser efficiency. Such an arrangement makes it possible to very selectively tune the spectral output of the apparatus.

According to another embodiment of the present invention, the dopant comprises a non-metallic element or compound.

According to a further embodiment of the present invention, the substrate is selected from the group consisting of Zinc Selenide, Zinc Sulfide, Zinc Telluride, Cadmium selenide, Cadmium sulfide, Cadmium Telluride, or Mercury Cadmium Telluride; and the dopant is Sulfur, Tellurium, or a combination of both.

According to another embodiment of the present invention, a method of forming an alloy material comprises: (a) heating a substrate comprising a layer of an alloying agent on at least one surface of the substrate; (b) applying a degree of isostatic pressure on the substrate for a time sufficient to induce migration of the alloying agent into the substrate to provide the alloy material; and (c) removing the isostatic pressure and cooling the alloy material. The alloy make according to this embodiment will have all of the same advantages listed above with regard to the doped substrates.

In accordance with a further embodiment of the present invention, a method of preparing a doped substrate is provided, the method comprises: (a) heating the doped substrate comprising a substrate and a dopant to a predetermined temperature; (b) applying a degree of isostatic external pressure on the doped substrate for a predetermined time sufficient to induce thermal diffusion of the dopant within the substrate; and (c) cooling the doped substrate to about room temperature and removing the isostatic pressure. Accordingly, a doped substrate such as is commercially-available may be process so as to achieve a spectral output in an extremely narrow linewidth, as further described herein.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
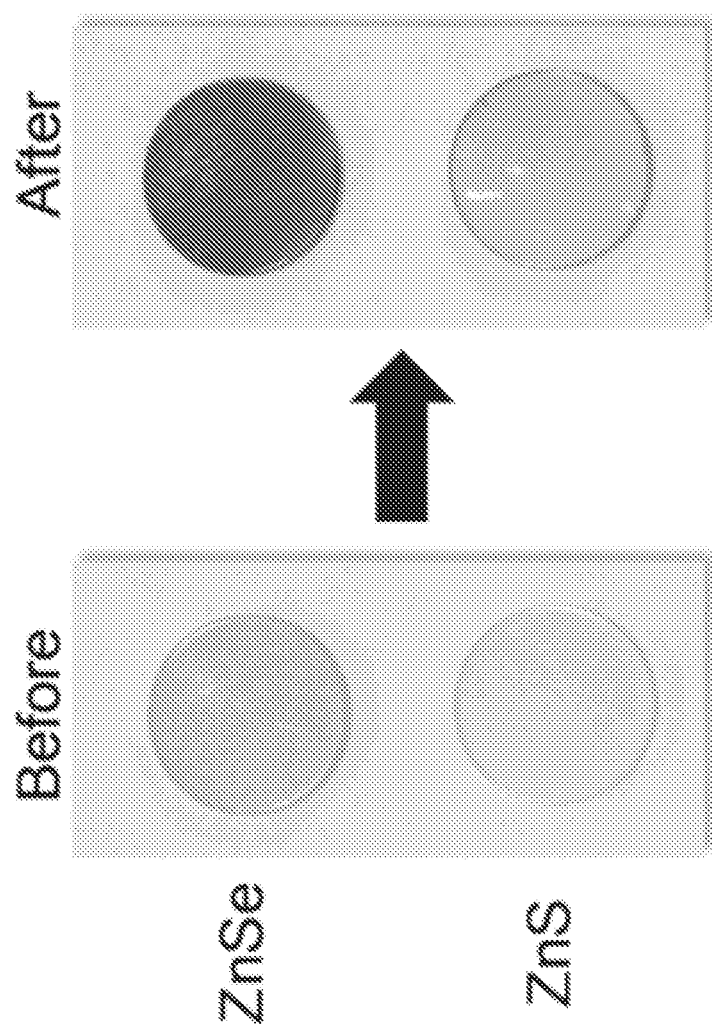
FIG. 1 depicts undoped and HIP-process, chromium-doped ZnSe and ZnS substrates, according to an embodiment of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

To address the limitations of the prior art, this invention describes an alternative thermal diffusion method which dramatically reduces both the production time (e.g., 1 day versus 90 days) and the individual cost of the crystals (e.g., $50 versus $3000). The method is broadly applicable to a wide range of laser crystals, scintillators, absorptive optical filters, and for producing alloy crystal materials which might be difficult or impossible to grow by other means.

Background for Hot Isostatic Pressing (HIP)

HIP treatment involves subjecting an object or material to simultaneous extreme pressure and elevated temperatures. The HIP manufacturing process, originating from the 1970's, is primarily intended as a means of removing defects from metal castings (i.e., voids and cracks). The material to be treated is placed into a rugged pressure vessel and subjected to extremely high gas pressures (typically 35,000 psi, but can be as high as 250,000 psi) while heated to a required temperature. The combination of heat and extreme pressure "squeezes" the pressure chamber contents uniformly from all directions (hence the term "isostatic") and causes any defects to be annealed from metal castings. Aluminum castings typically require soak temperatures of 900° C. for several hours while nickel based steel alloys may require higher temperatures for longer periods to be annealed. The same HIP treatment has also been used successfully to densify ceramic materials.

HIP treatment has been used as a means of removing defects from polycrystalline ZnSe in order to improve the material's laser damage resistance and to improve the two-photon absorption characteristics for nonlinear optical applications. As part of this development, it was noted that the band-edge optical transmission shifted slightly towards the blue end of the visible spectrum (so the samples became more pale yellow in color) and that the surface of HIP treated ZnSe crystals accumulated small deposits of contamination. The natural conclusion was that the HIP treatment effectively "squeezed out" any small quantities of internal contamination, or any excesses of free Zn or Se metals present in the crystal. During the same investigations, it was noted that the grain size of polycrystalline ZnSe increased from 70 microns to several mm during the HIP treatment, once again confirming the removal of defects from the material.

At the same time that we were exploring HIP treatment of undoped ZnSe for nonlinear optical applications, Cr:ZnSe and Fe:ZnSe were being investigated for use as efficient materials for tunable mid-IR lasers. During this research it had been assumed that the observed concentration quenching effects on the laser performance may have been due to the accumulation of Cr ions at the grain boundaries of the thermally diffused material. We tested this hypothesis by HIP treating Cr:ZnSe crystals; the implication being that if Cr ions were indeed present only at the crystal grain boundaries they would be "squeezed out" by the HIP process. Surprisingly, the reverse proved to be true; no Cr metal was observed to be removed from the host, and the laser properties remained largely unaffected by the HIP treatment. The only effect HIP had on the Cr:ZnSe samples was to grow the grains to mm sizes. Since the resulting grain sizes were significantly larger than the laser spot sizes in experiments, and because no change in the laser performance was noted with translation, this demonstrated that the Cr ions were intrinsically part of the crystal structure and were not interstitially located at grain boundaries.

Since the Cr:ZnSe crystals survived the HIP treatment, the possibility of using the HIP treatment as a method for deliberately contaminating an undoped crystal of ZnSe with Cr ions was considered. The idea was to see if would be possible to use the HIP process to thermally diffuse Cr ions into undoped ZnSe. This was a non-obvious inventive step since HIP treatment is widely assumed to be a method for removing material defects, rather than to use the same process to deliberately introduce defects in the form of a dopant species. Since crystal grain growth had been observed to be extremely rapid in prior undoped ZnSe tests, the hope was that HIP would also accelerate the diffusion rate of Cr ions into nominally undoped ZnSe, and this indeed proved to be the case.

Our first demonstration of HIP treatment as a means of doping a previously undoped material was carried out using undoped crystals of ZnSe and ZnS which were subsequently converted into Cr:ZnSe and Cr:ZnS, respectively. For this demonstration, a thin layer (ranging from 600 Å to 6000 Å) of chromium metal was deposited onto one face of undoped polycrystalline ZnSe and ZnS substrates using a Denton Discovery-18 sputtering chamber. Once sputtered, the crystals were individually loosely wrapped in molybdenum foil to act as a barrier to prevent any cross contamination between the samples. After loading into a HIP chamber, the crystals were treated for one hour at a temperature of 1000° C. and a pressure of 30,000 PSI in an inert argon environment. In the HIP process, an elevated temperature and high pressure are applied simultaneously, despite that they may be presented as sequential in the claims below. At this temperature and pressure, an exchange reaction took place whereby the chromium atoms diffused into the crystalline host, replacing the zinc in the crystalline lattice, and depositing the metallic zinc to the surface of the crystal.

Once the crystals were returned to room temperature and standard atmospheric pressure, the metallic zinc that had been drawn out of the crystals quickly oxidized, creating a surface film that needed to be polished off the face of each sample. FIG. 1 depicts before and after examples of the ZnSe (top) and ZnS (bottom) samples before (left) and after (right) the sputter deposition and HIP diffusion process. On the right, after the samples were sputtered and had undergone the HIP process, the residual zinc oxide was polished off to reveal the color characteristic of chromium doping. For ZnSe the characteristic red signature of chromium doping into the crystal substrate was observed. For ZnS the characteristic yellow signature of chromium doping into the crystal substrate was observed.

Figure 2:
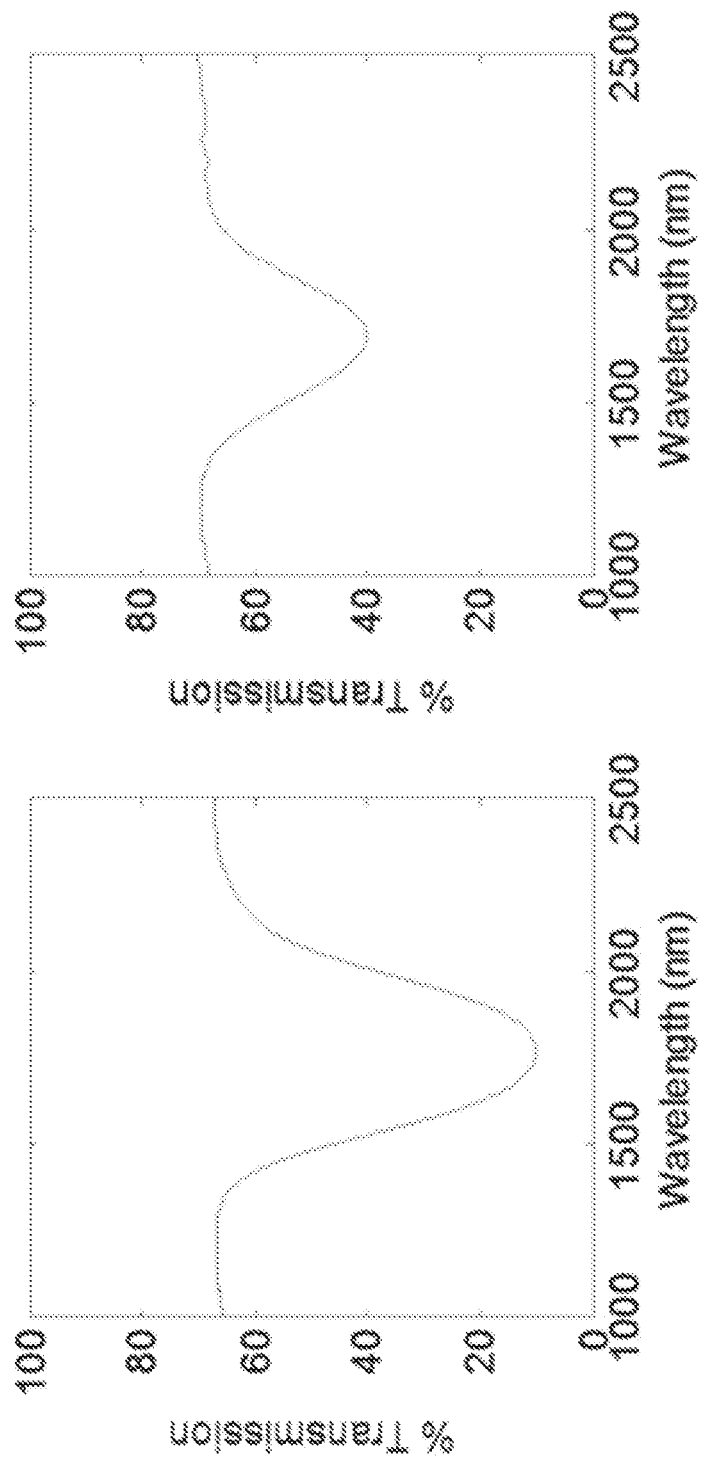
FIG. 2A illustrates transmission measurements of HIP treated Cr:ZnSe, according to an embodiment of the invention.
FIG. 2B illustrates transmission measurements of HIP treated Cr:ZnS, according to an embodiment of the invention.

Although the crystals resembled commercially available samples, further evidence was necessary to verify the presence of the correct $Cr^{2+}$ ionic state within the crystals. Therefore, the transmission of each sample was measured using a CARY spectrophotometer over the range of 1000 nm to 2500 nm. From these measurements, broad absorption features in the transmission spectra were observed for the 3000 Å, 4500 Å, and 6000 Å samples of both ZnSe and ZnS. As an example of this measurement process, the transmission of the 3000 Å puttered and HIP treated Cr:ZnSe and Cr:ZnS samples is shown in FIGS. 2A-2B. For Cr:ZnSe (FIG. 2A) the peak of the absorption dip is located at 1770 nm, and for Cr:ZnS the peak of the absorption dip is located at 1693 nm, providing further evidence for the presence of the correct ionic state of chromium doping.

Figure 3:
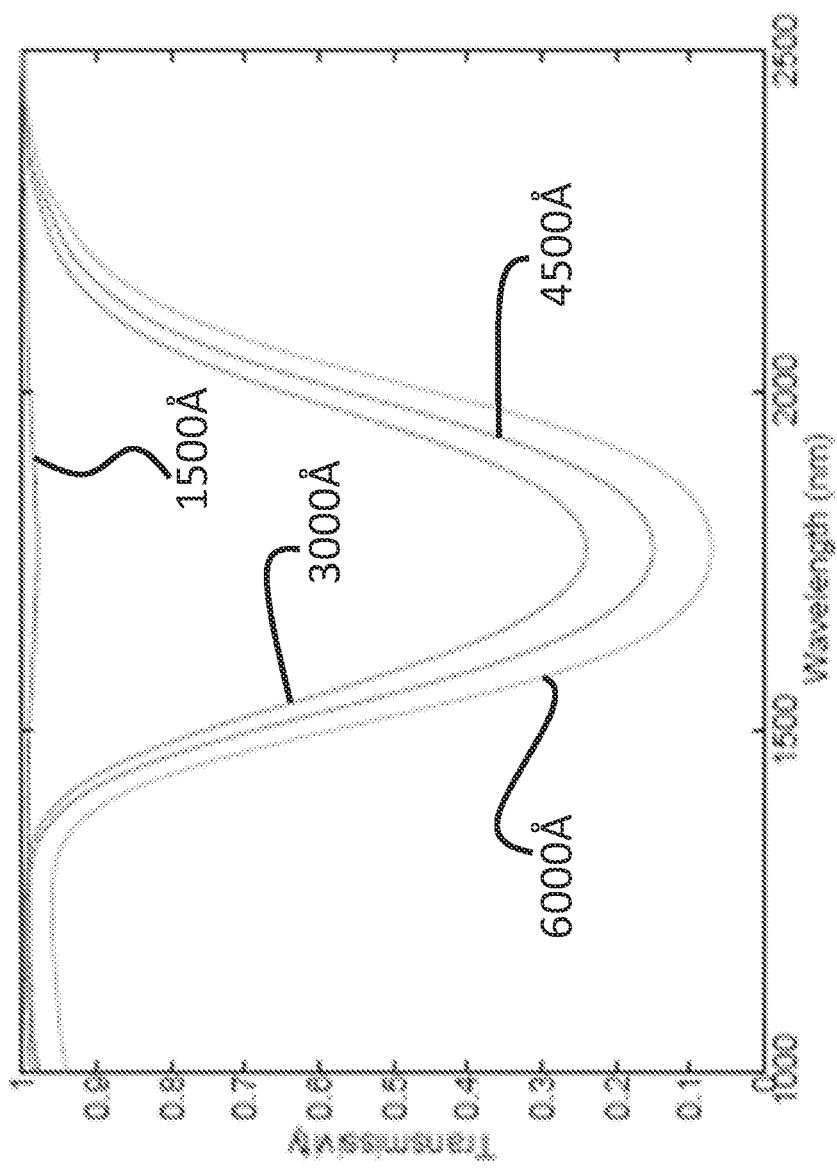
FIG. 3 illustrates the normalized transmissivity of HIP treated Cr:ZnSe as a function of wavelength for various initial sputtered thickness of chromium, according to an embodiment of the invention.

FIG. 3 illustrates the normalized transmissivity of HIP-treated Cr:ZnSe as a function of wavelength for various initial sputtered thickness of chromium. The individual curves represent sputtered thickness of 1500 Å, 3000 Å, 4500 Å, and 6000 Å, respectively. Note the broadband absorption dip centered at 1770 nm, which corresponds to $Cr^{2+}$ doped into ZnSe.

Figure 4:
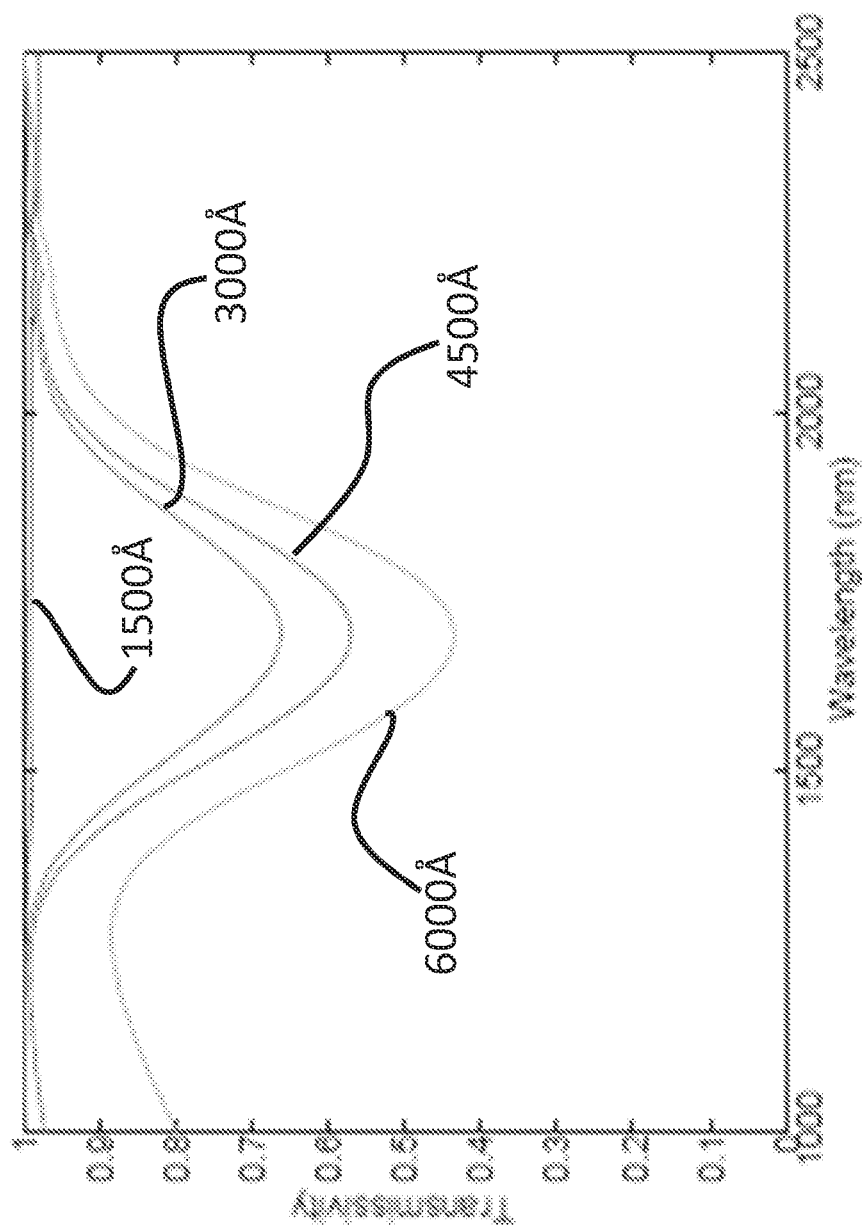
FIG. 4 illustrates the normalized transmissivity of HIP treated Cr:ZnS as a function of wavelength for various initial sputtered thickness of chromium, according to an embodiment of the invention.

FIG. 4 illustrates the normalized transmissivity of HIP-treated Cr:ZnS as a function of wavelength for various initial sputtered thickness of chromium. The individual curves represent sputtered thickness of 1500 Å, 3000 Å, 4500 Å, and 6000 Å, respectively. Note the broadband absorption dip centered at 1690 nm corresponding to $Cr^{2+}$ doped into ZnS.

It is important to note that while the sputtering/HIP process diffused ions into the crystalline host, the depth of the diffusion for this initial test was limited to a few hundred μm (see further discussion below). However, the total absorption profile measured by the CARY was comparable to that of millimeter-thick commercial samples. Therefore, the concentration of chromium ions in the sputtered/HIPed samples of the zinc selenide and zinc sulfide substrates was approximately an order of magnitude higher than the commercial samples because the chromium ions were all found within a relatively narrow band and not throughout the sample. The higher concentration of the HIP-treated samples is important because the doping percentage of commercial samples has thus far been limited due to concentration quenching effects in the excited state lifetime. Therefore, it was essential to measure the excited state lifetime of the in-house produced samples (with higher concentration) to make a comparison with commercially available samples.

Figure 5:
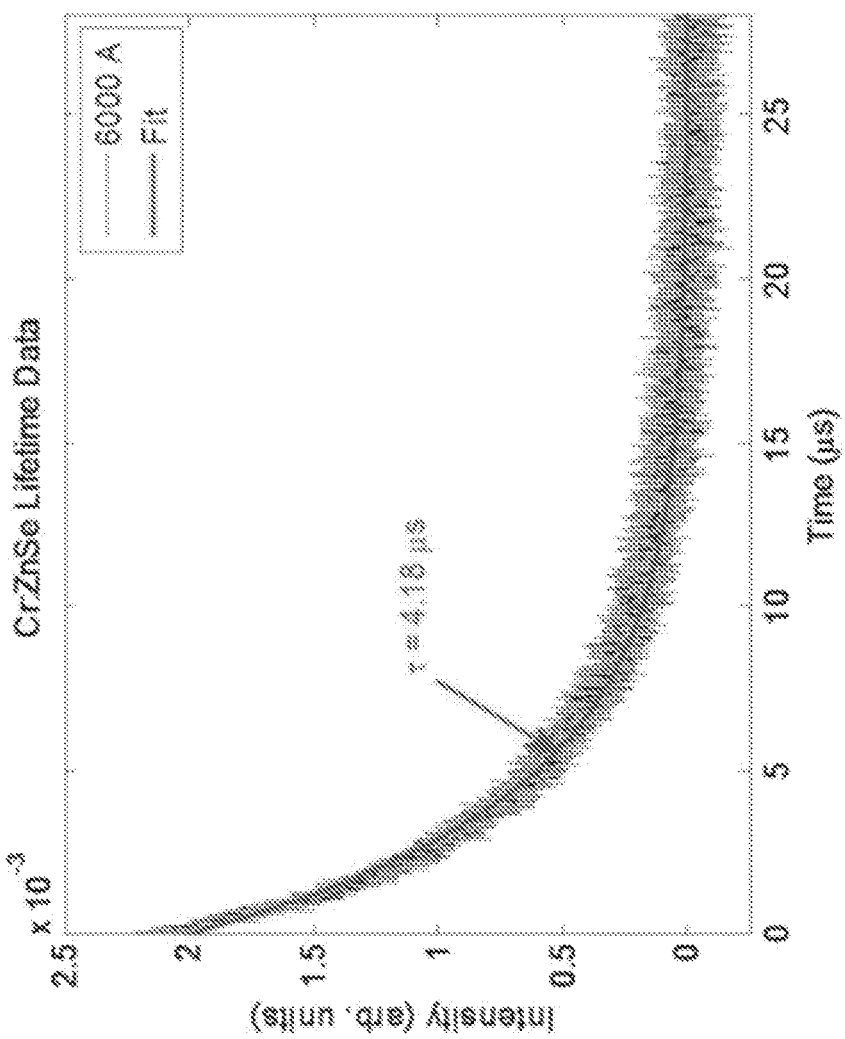
FIG. 5 illustrates the Measurement of the fluorescence decay from a 180 ns 2.0 µm Tm:Fiber laser pulse onto a 6000 Å Cr:ZnSe HIP treated sample, according to an embodiment of the invention.

To measure the excited state lifetime of the Cr:ZnSe and Cr:ZnS samples, a 180 ns, 2.0 μm pulsed Tm:Fiber laser was used to briefly illuminate the crystals. The resulting fluorescence decay was recorded as a function of time using an extended range InGaAs photodiode with a 2 μm long-pass optical filter in front to block out the residual pump light. Crystals having four different initial deposition thicknesses (1500 Å, 3000 Å, 4500 Å, and 6000 Å) were examined for both ZnSe and ZnS. A representative sample of the fluorescence decay is shown in FIG. 5 for the 6000 Å Cr:ZnSe sample.

For each measured sample, an exponential decay curve was fitted to the data to extract the lifetimes. The compiled results for the eight measured samples are shown in FIG. 5. For Cr:ZnSe and Cr:ZnS, the lifetime for the lowest concentration (corresponding to 1500 Å) was found to be 5.44 μs and 5.00 μs, respectively. As the concentration increased (greater initial deposition thickness), the lifetime decreased slightly to 4.18 μs and 3.53 μs respectively for 6000 Å. The observed slight decrease in lifetime is indicative of a small amount of concentration quenching. However, all of the measured values are similar to the typical 4-6 μs excited state lifetime for commercial samples, even though commercial samples have 10 times lower Cr ion concentrations.

While the in-house produced samples do have a slight concentration dependence on lifetime, advantageously, the concentration can be raised to dramatically higher doping percentages without the usual detrimental effects seen in the commercially available samples. Measured excited state lifetimes for Cr:ZnSe and Cr:ZnS for four thicknesses of sputtered metallic chromium are presented in Table 1 below. For each sample, thicknesses of 1500 Å, 3000 Å, 4500 Å, and 6000 Å were deposited, resulting in higher dopant concentrations after the HIP process. The decrease in lifetime for both substrates with increasing concentrations is indicative of the presence of concentration quenching in these samples.

TABLE 1

| Thickness | Cr:ZnSe | Cr:ZnS |
|---|---|---|
| 1500 Å | 5.44 μs | 5.00 μs |
| 3000 Å | 4.35 μs | 3.99 μs |
| 4500 Å | 4.29 μs | 3.83 μs |
| 6000 Å | 4.18 μs | 3.53 μs |

Figure 6:
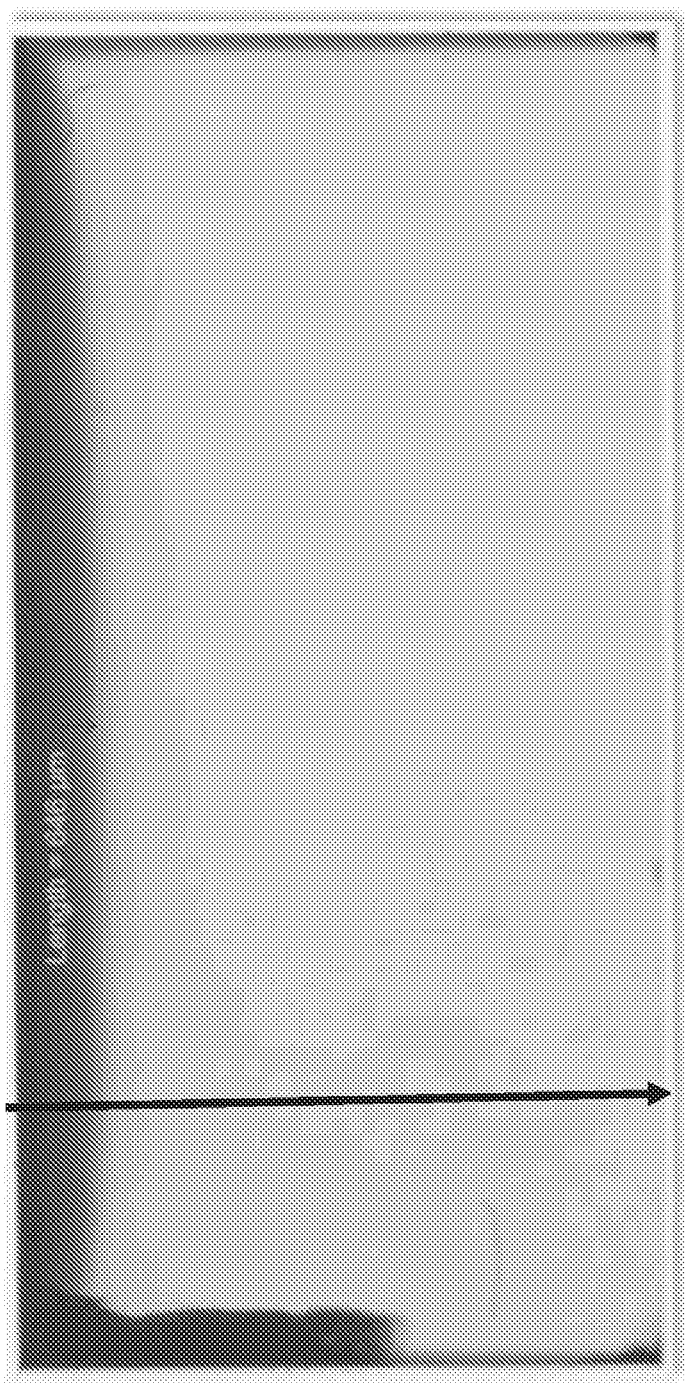
FIG. 6 depicts a side view of a HIP treated and polished 5000 Å Cr:ZnSe sample as imaged through a microscope, according to an embodiment of the invention.

An attempt was made to characterize the diffusion rate of the chromium ions into the zinc selenide crystal. For this, an additional sample was manufactured whereby a 5000 Å chromium film was sputtered onto the zinc selenide crystal and then HIP treated. Unlike the previous samples, this sample was a rectangular prism and allowed for cross-sectional imaging of the diffusion. After polishing, the sample was imaged using a calibrated microscope. FIG. 6 depicts the captured image from that measurement. It is clearly evident that the chromium ions diffuse approximately 650 μm into the sample for a one hour soak time at elevated temperature and pressure.

Figure 7:
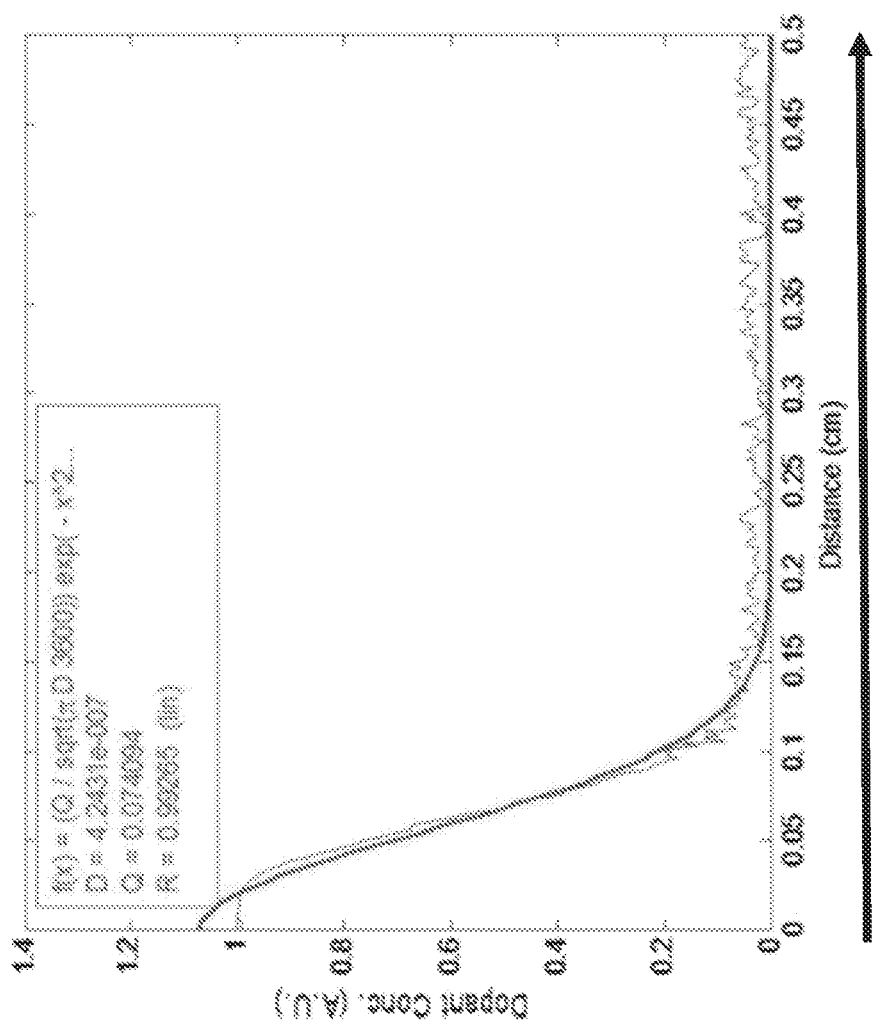
FIG. 7 illustrates the distribution of chromium ions as a function of distance as diffused into the ZnSe substrate, according to an embodiment of the invention.

As illustrated in FIG. 7, from the calibrated image of FIG. 6, a vertical slice was taken using Matlab software and was used to determine the distribution of ions as a function of distance into the crystal sample. The arrow of FIG. 6 corresponds to the horizontal axis (see arrow) of FIG. 7. FIG. 7 illustrates the concentration distribution as a function of position within the Cr:ZnSe crystal. This distribution has been fit with a diffusion equation to extract the diffusion length of chromium into the zinc selenide substrate. FIG. 7 shows a plot of this distribution normalized to the peak concentration (where the image was saturated). From this plot, a diffusion equation of the form (below) was fitted, $$C(x, t) = \frac{Q}{\sqrt{\pi D t}} e^{\left(\frac{-x^2}{4Dt}\right)}$$

where Q is the dopant "dose", D is the diffusion coefficient, x is the distance into the sample, and t is time. From this fit, a diffusion coefficient of $4.24 \times 10^{-7}$ cm$^2$/s was determined. It is extremely interesting to note that published values for the diffusion coefficient of commercially produced Cr:ZnSe at atmospheric pressure is on the order of $5.4 \times 10^{-10}$ cm$^2$/s, implying that our HIP treatment is three orders of magnitude faster than previously reported values.

Figure 8:
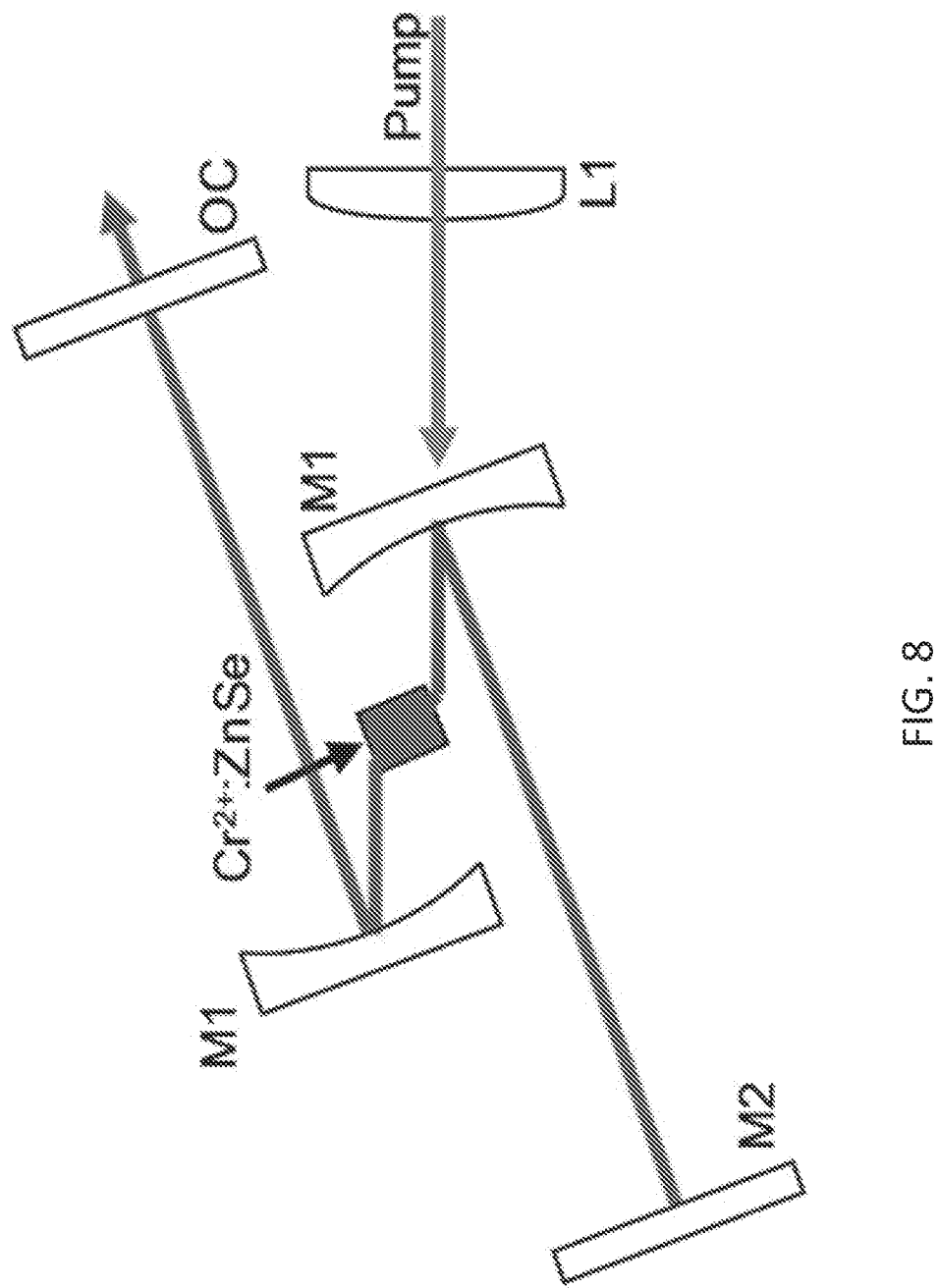
FIG. 8 depicts a Z-cavity layout used to verify the suitability of HIP-treated materials for laser operation, according to an embodiment of the invention.

With the sample well characterized, the final step to quantify our HIP-treated crystals was to test them for laser action. For this experiment, a standard "z-cavity" was used, as depicted in FIG. 8. In this simple test the crystals did not have any anti-reflective coatings, so they were rotated to be at Brewster's angle inside the resonator to minimize reflection losses. Two dichroic curved mirrors (M1) surrounded the laser crystal and were spaced such that the two legs (from M1 to the output coupler OC and from M1 to the turning mirror M2) were nominally collimated. The dichroic mirrors were anti-reflective at the 1908 nm pump laser wavelength and highly reflective at the 2500 nm Cr laser wavelength. The pump laser light was mode matched to the resonator via the lens L1 before being injected into the resonator cavity.

Figure 9:
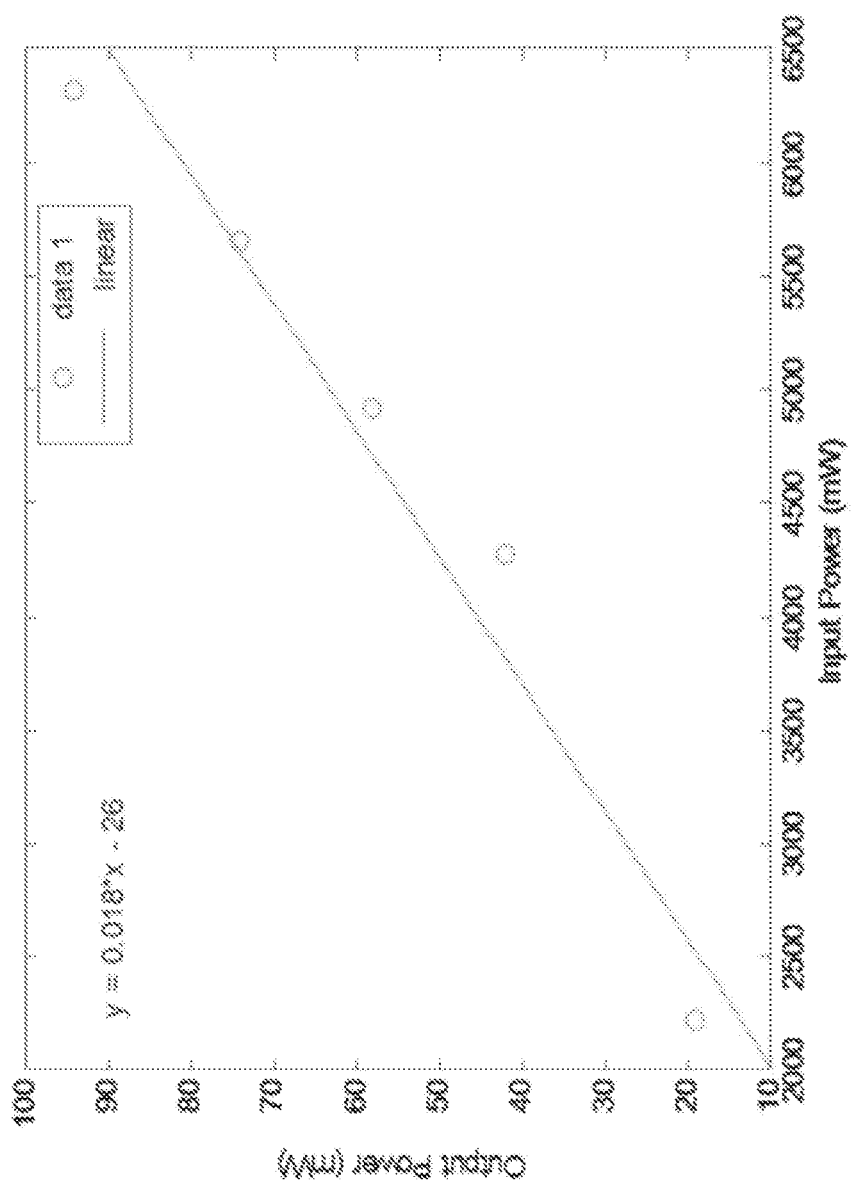
FIG. 9 illustrates the power output of the narrow bandwidth oscillator achieved with HIP-treated materials, according to an embodiment of the invention.

Using an output coupler reflectivity of 99%, laser operation was immediately demonstrated. Measurements of the output power as a function of pump input were made in order to determine the optical-to-optical slope efficiency of the laser. The result of this measurement is plotted in FIG. 9, which illustrates power output of the narrow bandwidth oscillator realized with in-house produced HIP laser samples. From a linear fit to the data, an optical to optical efficiency of 1.8% is measured. While this value is low, the output coupler of the laser was not optimized, limiting performance. Note that for this test the output coupler reflectivity value was not optimized and significantly more power is available with lower reflectivity mirrors. The intention here was simply to demonstrate laser action by maximizing the feedback into the laser cavity.

Figure 10:
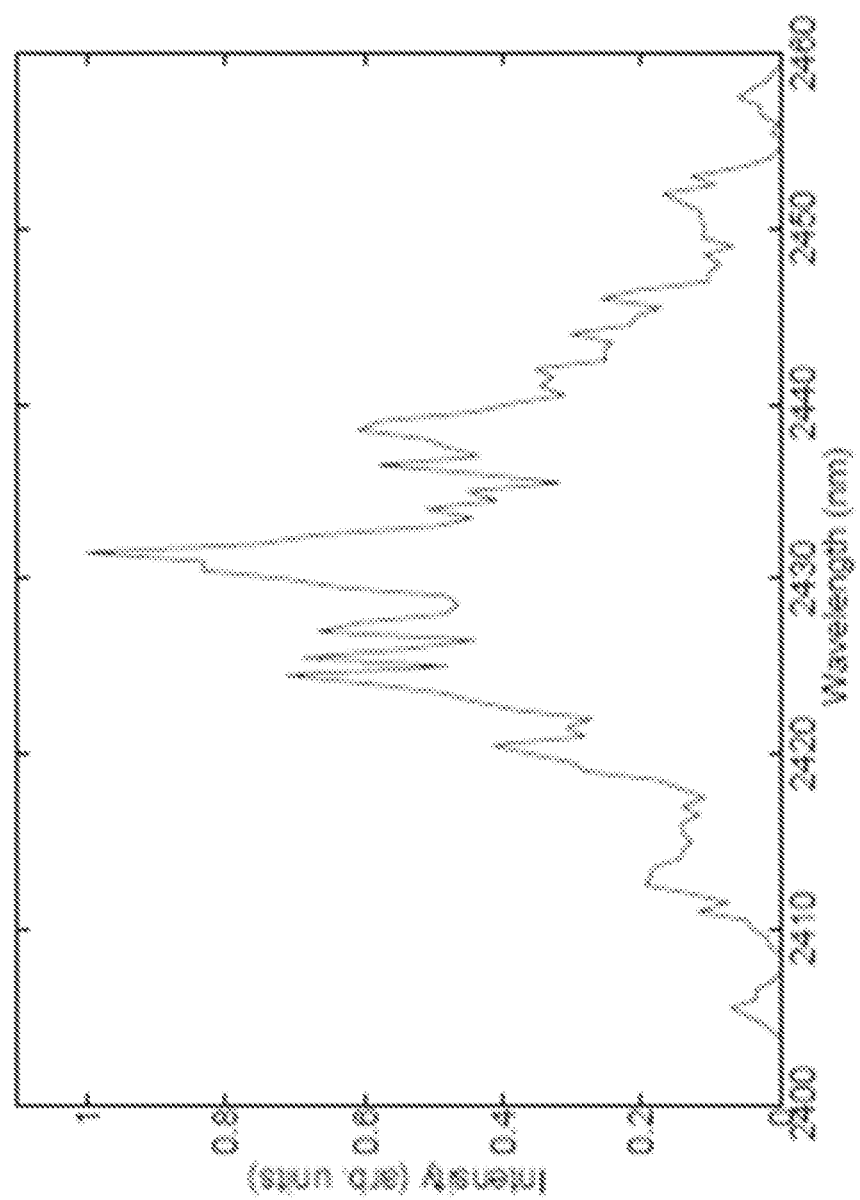
FIG. 10 illustrates the spectral output of a laser cavity for a commercially-available sample of Cr:ZnSe, according to an embodiment of the invention.
Figure 11:
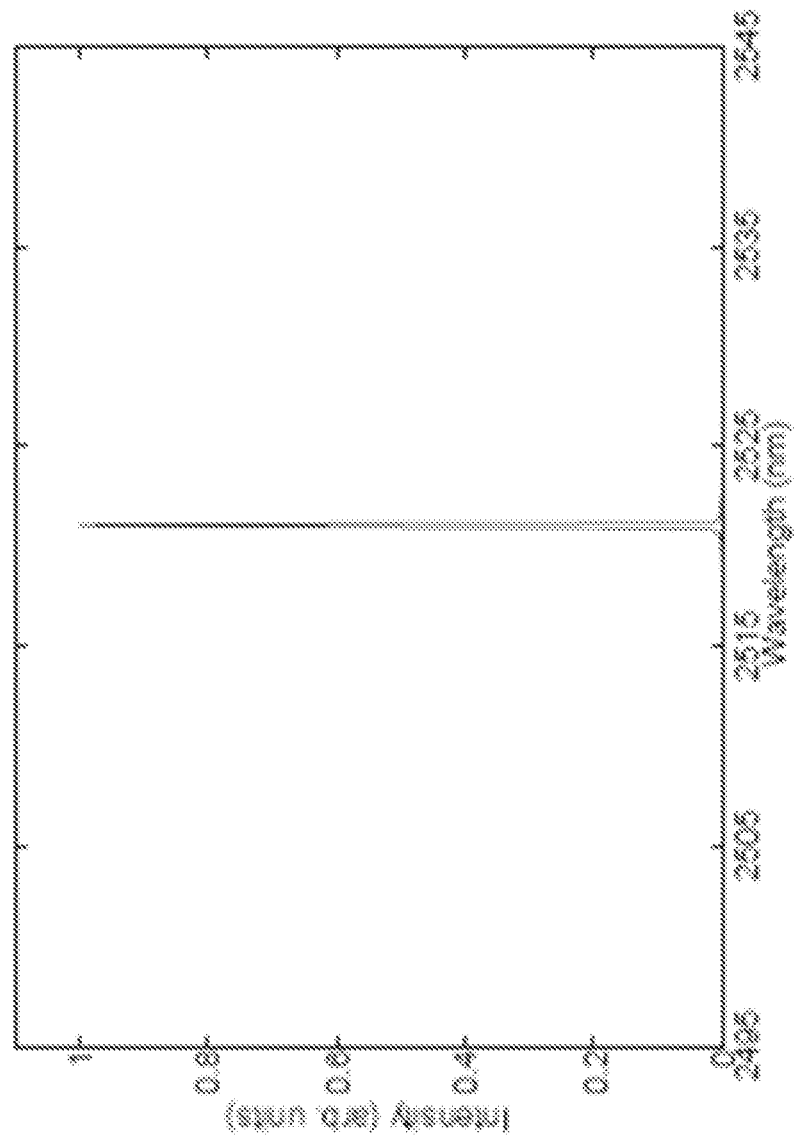
FIG. 11 illustrates the spectral output of a HIP-treated Cr:ZnSe laser crystal as measured on an OSA, according to an embodiment of the invention.

Having established laser operation, the spectral characteristics of the laser were measured using a spectrum analyzer. Commercially available samples, e.g. from IPG photonics, have traditionally exhibited significant amounts of inhomogeneous broadening, resulting in a spectral output on the order of 50 nm, as seen in FIG. 10. Note the bandwidth is extremely large, spanning tens of nanometers, indicative of inhomogenous broadening within the gain medium. However, for our in-house HIP-manufactured crystals, it was found that the spectral output was single frequency, having a linewidth of less than 140 pm, corresponding to the resolution linewidth of the spectrum analyzer, as seen in FIG. 11. Subsequent measurements, made by a Michelson interferometer, revealed the linewidth is approximately 50 pm. Although the center wavelength for each of the two plots is different, the horizontal range is similar, indicating that the in-house crystals are far more suitable for applications involving narrow frequency operation. The spectral brightness of HIP produced Cr :ZnSe is therefore at least two orders of magnitude better than standard commercially produced material. Note also that the peak of the commercially-procured Cr:ZnSe substrates exhibits a peak at about 2430 nm, while the in-house HIP-manufactured Cr:ZnSe crystals exhibits a red-shift to about 2522 nm, which corresponds to the higher density of $Cr^{2+}$ in the HIP-manufactured crystals.

Note too that the standard HIP treatment process has a capacity to treat hundreds of crystals at once, and to complete the HIP treatment on one day, rather than several weeks to months required with current commercial methods. The cost of HIP Cr diffusion is therefore negligible. Our test substrates of polycrystalline ZnSe and ZnS cost approximately $50 each and so the cost per finished sample is less than $100, compared with $3000+ for commercial samples.

Figure 12:
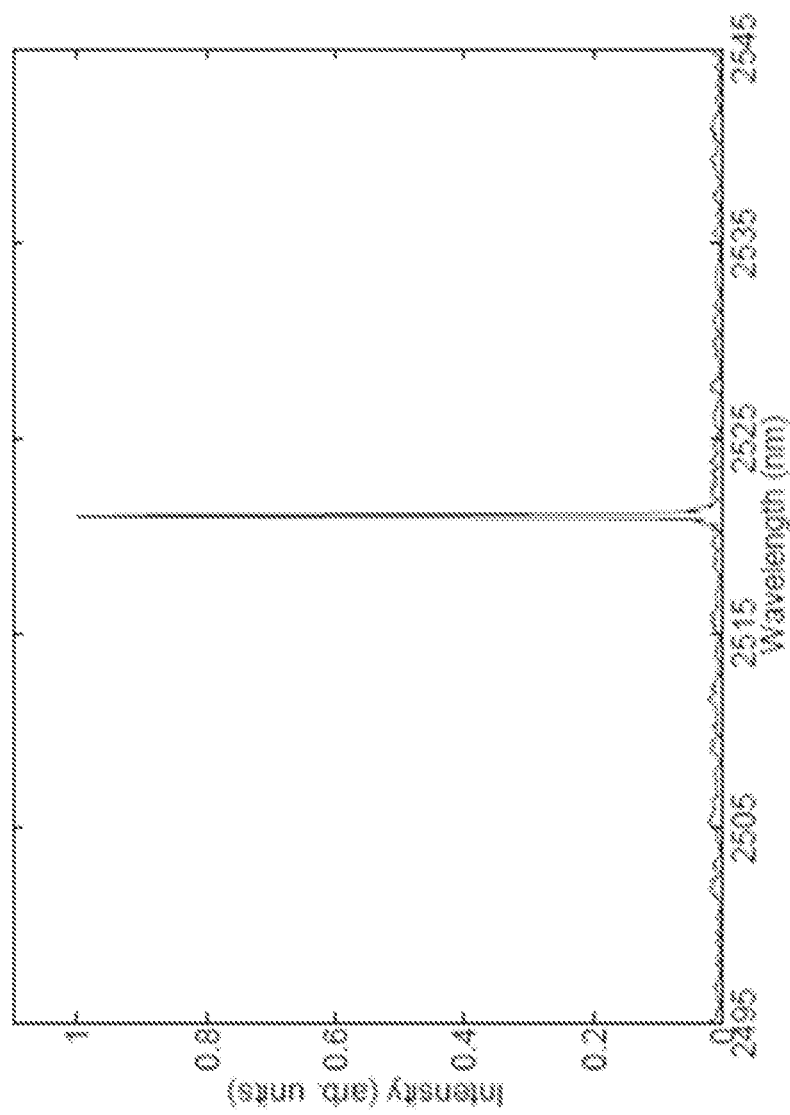
FIG. 12 illustrates the spectral output for a HIP-treated commercial Cr:ZnSe laser crystal, according to an embodiment of the invention.

Notwithstanding the foregoing, it was determined that commercially-purchased doped substrates may also, using the current process, be treated to exhibit the same performance. To determine the root cause for the narrowing of the output spectrum observed for the HIP-diffused Cr:ZnSe laser, an additional HIP run was performed where a commercially-purchased, diffusion-doped Cr:ZnSe sample was treated. This crystal was subjected to similar temperatures, pressures, and soak time as the other samples whose performance was characterized above. However, for this experiment, the doped crystal did not have any additional chromium sputtered on its surface. Once the HIP process was complete, the sample was placed at Brewster's angle into the z-cavity depicted in FIG. 8. Light from the laser was again coupled into an OSA and the resulting spectrum is shown in FIG. 12. Remarkably, after HIP treatment, the spectral bandwidth of the commercial sample had also reduced to the 140 pm resolution limit of the OSA. This is significant because it demonstrates that the spectral narrowing results from the HIP process, most probably because the HIP process has removed defect centers from the crystal, eliminating the most likely origin of the inhomogenous broadening noted in FIG. 10.

Figure 13:
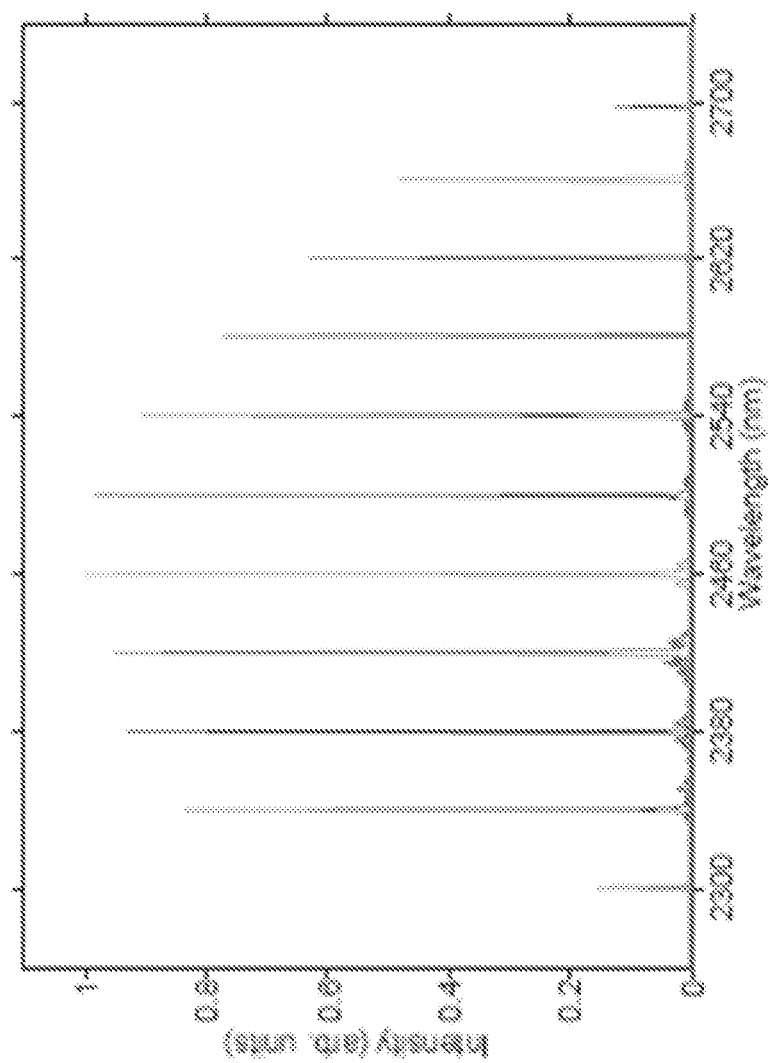
FIG. 13 illustrates the spectral output of the Cr:ZnSe laser as a function of wavelength when tuned using an intracavity diffraction grating, according to an embodiment of the invention.

Next, an experiment was performed where the laser was tuned to determine if the linewidth of the free running laser remained narrow across the entire range of the gain bandwidth. For this measurement, the end mirror, M2 in FIG. 8, was replaced with a blazed optical grating in Littrow configuration, having 300 grooves/mm and a blaze wavelength of 2.5626 mm. As the grating was rotated, the wavelength was measured using the OSA and the output power of the laser was recorded. FIG. 13 illustrates the results of this measurement as the laser was tuned from 2300 nm to 2700 nm in 40 nm steps. The peak heights have been scaled relative to the maximum output power in order to approximate the gain bandwidth envelope of the Cr:ZnSe material. From FIG. 13 it can be seen that not only can the output wavelength of the HIP-treated Cr:ZnSe crystals be continuously tuned over a 400 nm range, the spectral output remains narrow as well; the spectral narrowing corresponding to a homogeneously-broadened gain media remains intact over the entirety of the tuning range from 2300 to 2700 nm.

Although current commercially-produced material may be significantly improved through the HIP process, HIP also provides a dramatic increase in the doping diffusion rate, as explained above. This makes HIP an ideal one-step process for simultaneously doping and removing underlying defect structures in the crystal substrate.

Since demonstrating the benefits of dramatically accelerated production, greatly reduced cost, large increase in active ion concentration, and dramatically increased laser spectral brightness in Cr:ZnSe, we have used the same process to produce a very wide range of other doped materials. At the time of writing this report we have fabricated ZnSe and ZnS crystals with HIP doped transition metal elements. These new samples are being tested now for their spectroscopic properties and potential laser use: Silver (Ag), Gold (Au), Cobalt (Co), Chromium (Cr), Copper (Cu), Iridium (Ir), Iron (Fe), Manganese (Mn), Molybdenum (Mo), Niobium (Nb), Nickel (Ni), Nickel/Chromium (Ni/Cr), Palladium (Pd), Platinum (Pt), Rhenium (Re), Rhodium (Rh), Ruthenium (Ru), Tantalum (Ta), Titanium (Ti), Vanadium (V), Tungsten (W), Zirconium (Zr), and Tungsten/Titanium (W/Ti).

It is natural to extend the aforementioned description of using HIP treatment to consider other material systems. These may include glasses, single crystals and poly-crystals of other materials, and ceramics. Non-limiting examples of substrates include Zinc selenide (ZnSe), Zinc Sulphide (ZnS), Yttrium Aluminum Garnet (YAG), Yttrium Lithium Fluoride (YLF), Yttrium orthovanadate (Nd:YVO$_4$), Neodymium doped yttrium calcium oxoborate Nd:YCa4O(BO$_3$)$_3$, silicate glass, phosphate glass, sapphire, lithium strontium (or calcium) aluminum fluoride (Ce:LiSAF, Ce:LiCAF), chrysoberyl (alexandrite), calcium fluoride (CaF$_2$), Gallium Nitride (GaN), Gallium Phosphide (GaP), Indium Gallium Nitride (InGaN), Aluminum Gallium Indium Nitride (InGaInP), Aluminum Gallium Arsenide Phosphide (InGaAsP), Lithium niobate (LiNbO$_3$), Potassium Niobate (KNbO$_3$), Strontium Barium Niobate (SBN), Yttrium Scandium Gallium Garnet (YSGG), Yttrium Vanadate (YVO$_4$), Terbium Gallium Garnet (Tb$_3$Ga$_5$O$_{12}$), Potassium Gadolinium Tungstate (KGW), Forsterite (Mg$_2$SiO$_4$), Barium Yttrium Fluoride (BaY$_2$F$_5$), Barium Yttrium Lutetium Fluoride (BaYLuF$_5$), and combinations thereof.

Generalized HIP conditions may include: 1) heating the substrate to about 100° C. to about 2,500° C.; 2) applying the degree of isostatic external pressure may be between about 1,000 PSI to about 250,000 PSI; the time sufficient to induce migration of the metallic dopant into the substrate may be between about 1 hour to about 1000 hours, or about 1 hour to about 500 hours, or about 1 hour to about 50 hours, etc. A thickness of the layer of dopant may be within a range from about 60 Å to about 60,000 Å.

Accordingly, heating the substrate and applying the desired degree of isostatic external pressure may be performed in a non-reactive atmosphere. Additionally, heating the substrate and applying the degree of isostatic external pressure may be performed in an atmosphere comprising Argon, Nitrogen, Carbon Dioxide, Neon, Helium, or combinations thereof The produced materials may variously be useful as lasers, scintillators, nonlinear optical materials, and as passive filters. The same HIP treatment may also prove useful in creating novel alloyed materials, both optical and physical. Just as we have successfully demonstrated successful HIP diffusion of metallic species from the list above into ZnSe and ZnS, the HIP process may be used to diffuse system-related materials into any given substrate. For example, cadmium and tellurium may be simultaneously diffused into ZnSe to create a CdTeZnSe alloy. Similarly, multiple dopants may be diffused simultaneously to create multiply-doped materials. For example, Cr and Fe may both be diffused into ZnSe to create Cr:Fe:ZnSe, so that optical pumping of the Cr transition may be used to locally excite Fe laser action. And, of course, multiple dopants may be combined with alloying. The exposure time to the HIP environment determines the diffusion of the alloy and dopant species, and each alloy and dopant species may have different diffusion rates for any given HIP "recipe". HIP treatment may therefore be used to create graduated doping or alloying in a manner not possible through traditional crystal growth techniques.

The HIP doping method described above is not limited to optical materials. The same or similar HIP treatment method may be useful for the creation of doped semiconductors, magnetic materials, ferroelectrics, pyroelectrics, and metallic or non-metallic alloys.

Accordingly, in another embodiment, a method of forming an alloy material is provided, comprising: (a) heating a substrate comprising a layer of an alloying agent on at least one surface; (b) applying a degree of isostatic external pressure on the surface of said substrate effective to induce migration of the alloying agent into the substrate to provide the alloy material; and (c) cooling the alloy material to about room temperature.

As explained above, Hot Isostatic Pressing (HIP) as a means of introducing a contaminant or doping species to an otherwise nominally pure host material. The host may comprise a single crystal, a polycrystalline material, a glass material, a ceramic material, or a semiconductor material. The host material may be optically transparent. The doping material may comprise one or more transition metals. The doping material may comprise one or more rare earth elements. The doping material may comprise a combination of one or more rare earth elements and one or more transition metals. The doping material may comprise a combination of one or more segregated layers. A multiplicity of dopant materials may also be applied simultaneously, as a blended layer or as a eutectic.

The resulting doped material may be used in a laser. The resulting material may be a nonlinear optical material, a Raman active material, an absorbing filter, a piezoelectric material, a pyroelectric material, a ferroelectric material, a scintillator, a magnetic material, a semiconductor material, a metal alloy, a non-metal alloy, or combinations thereof.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative apparatus and methods and illustrative examples shown and described. Accordingly, departures may be made from such details without departing from the scope or the spirit of the general inventive concept exemplified herein.

What is claimed is:

1. A doped substrate comprising:
   a substrate comprising at least one of a glass material, a single crystal material, a poly-crystalline material, a ceramic material, or a semiconductor material; and
   a dopant comprising one or more transition metals, one or more rare earth elements, or a combination of both, the doped substrate characterized in that a spectral laser output of the doped substrate exhibits a nominally single frequency having a linewidth less than about 5 nm.

2. The doped substrate of claim 1, wherein a spectral laser output of the doped substrate is characterized by a nominally single frequency having a linewidth less than about 1 nm.

3. The doped substrate of claim 1, wherein a spectral laser output of the doped substrate is characterized by a nominally single frequency having a linewidth less than about 140 pm.

4. The doped substrate of claim 1, wherein the substrate is optically transparent.

5. The doped substrate of claim 1, wherein the dopant is one or more atomic or ionic species of an element selected from the group consisting of silver, gold, cobalt, chromium, copper, iridium, iron, manganese, molybdenum, niobium, nickel, palladium, platinum, rhenium, rhodium, ruthenium, tantalum, titanium, vanadium, tungsten, zirconium, scandium, yttrium, lanthanum, cerium, praseodymium, neodymium, samarium, europium, gadolinium, terbium, dysprosium, holmium, erbium, thulium, ytterbium, lutetium, or combinations thereof.

6. The doped substrate of claim 1, wherein the dopant comprises one or more layers of distinct chemical species, a plurality of blended dopant materials, or a plurality of dopant materials as a eutectic.

7. The doped substrate of claim 1, wherein a thickness of the dopant is within a range from about 60 Å to about 60,000 Å.

8. The doped substrate of claim 1, wherein the dopant further comprises a non-metallic element or compound.

9. The doped substrate of claim 8, wherein the substrate is selected from the group consisting of zinc selenide, zinc sulfide, zinc telluride, cadmium selenide, cadmium sulfide, cadmium telluride, mercury cadmium telluride; and the dopant is sulfur, tellurium, or a combination of both.

10. The doped substrate of claim 1, wherein the substrate is selected from the group consisting of zinc selenide (ZnSe), zinc sulphide (ZnS), yttrium aluminum garnet (YAG), yttrium lithium fluoride (YLF), yttrium orthovanadate ($Nd:YVO_4$), neodymium doped yttrium calcium oxoborate (Nd: $YCa_4O(BO_3)_3$), silicate glass, phosphate glass, sapphire, lithium strontium (or calcium) aluminum fluoride (Ce:LiSAF, Ce:LiCAF), chrysoberyl (alexandrite), calcium fluoride ($CaF_2$), gallium nitride (GaN), gallium phosphide (GaP), indium gallium nitride (InGaN), aluminum gallium indium nitride (AlGaInN), lithium niobate (LiNbO$_3$), potassium niobate (KNbO3), strontium barium niobate (SBN), yttrium scandium gallium garnet (YSGG), yttrium vanadate (YVO$_4$), terbium gallium garnet (Tb$_3$Ga$_5$O$_{12}$), potassium gadolinium tungstate (KGW), forsterite (Mg$_2$SiO$_4$), barium yttrium fluoride (BaY$_2$F$_5$), barium yttrium lutetium fluoride (BaYLuF$_5$), aluminum gallium arsenide phosphide (AlGaAsP), and combinations thereof.

11. The doped substrate of claim 1, wherein the substate is ZnSe or ZnS and the dopant is chromium or iron.

12. The doped substrate of claim 1 which comprises a solid state laser material.

13. The doped substrate of claim 1 wherein the dopant alters the optical properties of the substrate.

14. The doped substrate of claim 1, wherein the dopant is diffused into the substrate a depth of up to approximately 650 μm.

\* \* \* \* \*